(12) United States Patent
Ishiba et al.

(10) Patent No.: US 6,526,053 B1
(45) Date of Patent: Feb. 25, 2003

(54) METHOD AND APPARATUS FOR TRANSMITTING PACKETS AND NETWORK USING THE SAME

(75) Inventors: Kazuo Ishiba, Tokyo (JP); Kohei Eguchi, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/267,779

(22) Filed: Mar. 15, 1999

(30) Foreign Application Priority Data

Apr. 13, 1998 (JP) .............................. 10-100878

(51) Int. Cl.⁷ .............................................. H04L 12/50
(52) U.S. Cl. ...................... 370/389; 370/395.1; 370/465
(58) Field of Search ................................. 370/389, 397, 370/399, 464, 465, 466, 474, 395.1, 395.5, 395.51, 395.52, 395.53, 395.6, 395.64, 395.65

(56) References Cited

U.S. PATENT DOCUMENTS 5,740,158 A * 4/1998 Aoki et al. ................. 370/397
6,134,249 A * 10/2000 Nakao ........................ 370/528

FOREIGN PATENT DOCUMENTS

| JP | 05-135187 | 1/1993 |
| JP | 06-030018 | 4/1994 |

* cited by examiner

Primary Examiner—Dang Ton
(74) Attorney, Agent, or Firm—Rabin & Berdo, P.C.

(57) ABSTRACT

A packet transmitting method of processing a packet having a control information area and a user information area by a functional block in a node and, thereafter, transmitting the packet from the node. Whether information of the user information area is useless for the user or not is discriminated on the basis of information of the control information area or the user information area. The packet judged to be useless is converted into a predetermined format in which the number of alternating times of a bit pattern has been reduced and the packet is allowed to pass through the functional block. The bit pattern of the packet is returned to a state before the conversion at least before the packet is transmitted from the node.

6 Claims, 6 Drawing Sheets

METHOD AND APPARATUS FOR TRANSMITTING PACKETS AND NETWORK USING THE SAME

BACKGROUND OF THE INVENTION

1. Field of the Invention

The present invention relates to a packet transmitting apparatus which can be applied to, for example, various nodes such as an ATM (Asynchronous Transfer Mode) switchboard and the like.

The invention also relates to a network using the packet transmitting apparatus as a node.

The invention further relates to a packet transmitting method which is used in the network or node.

2. Description of Related Art

ATM (Asynchronous Transfer Mode) technique is being developed extensively.

As an example of literature regarding a conventional technique of this kind, the following literature is known.

"Easy to understand B-ISND technique"

(p. 143, compiled by The new ITU association of Japan, Inc.)

As described in this literature for example, even when a 53-byte cell complying with the ITU-T (International Telecommunications Union—Telecommunications Standardization Sector) recommendation is an idle cell which does not have valid user information in the payload field, the number of alternating times between "0" and "1" of each bit is equal to eight in a cell header and is equal to 288 (=6×48) in the payload field.

Figure 1:
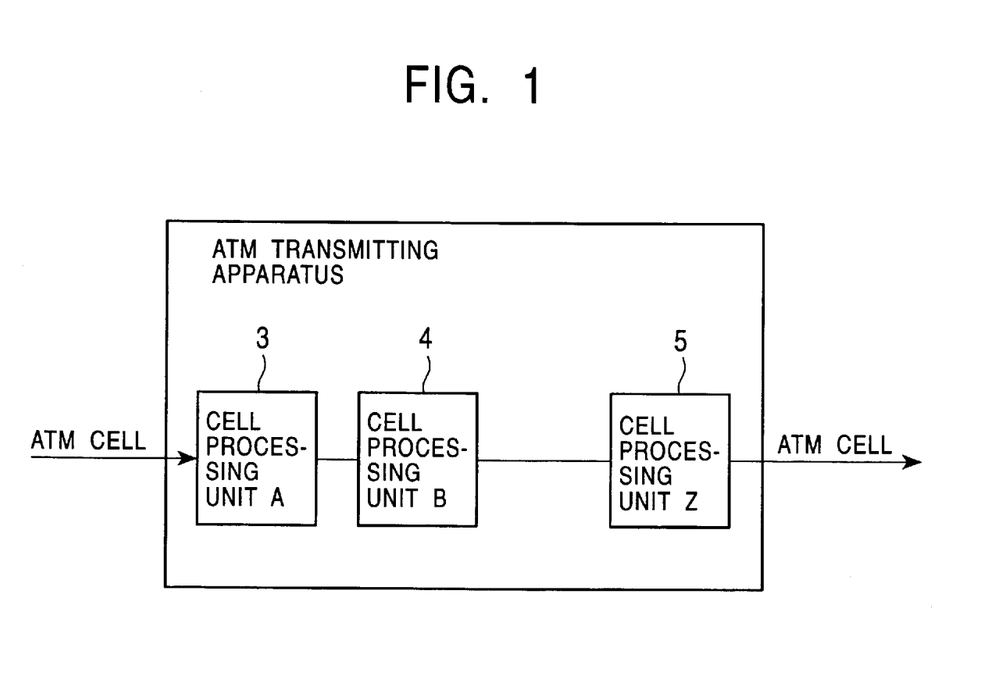
FIG. 1 is a block diagram schematically showing an example of a conventional ATM switchboards

An ATM transmitting apparatus, such as a conventional ATM switchboard or the like, is shown in FIG. 1. As shown in the figure, processes of an ATM layer such as cell processing units 3 to 5 are performed directly to all of ATM cells including idle cells.

When reading the ATM cell of (1 byte×53 bytes) in various transmitting apparatuses (nodes) of the ATM cells, the operation for sequentially reading the bits in each byte from one end to the other end and also reading the next one byte from one end to the other end is repetitively executed for the number of times corresponding to 53 bytes. In other words, when the ATM cells are serially read, even if a CMOS (complementary MOS) circuit whose electric power consumption is small is used, the larger the number of alternating times, the more the electric power consumed by circuits in the transmitting apparatus.

When the electric power consumption increases as mentioned above in each circuit in the transmitting apparatus, waste of the electric power in the whole transmitting apparatus becomes very large.

OBJECT AND SUMMARY OF THE INVENTION

In order to solve the problem, according to a first aspect of the invention, a packet transmitting method of processing a packet having a control information area and a user information area by a function block in a node. and, thereafter, transmitting the packet from the node comprises the following steps.

That is, (1) whether information in the user information area of the packet is useless for the user or not is discriminated on the basis of the information in the control information area or the user information area, (2) the packet judged useless is converted into a predetermined format in which the number of alternating times of a bit pattern has been reduced and the packet is allowed to pass through the function block, and (3) the bit pattern of the packet is returned to a state before the conversion at least before the packet is transmitted from the node.

According to a second aspect of the invention, a packet transmitting apparatus for processing a packet having a control information area and a user information area by a function block in a node and transmitting the packet from the node comprises:

discriminating means for discriminating whether information of the user information area in the packet is useless for the user or not on the basis of the information of the control information area or the user information area; first format converting means for converting the packet determined to be useless into a predetermined format in which the number of alternating times of a bit pattern has been reduced and allowing the packet to pass through the function block; and second format converting means for returning the bit pattern of the packet to a state before the conversion at least before the packet is transmitted from the node.

Furthermore, in a network according to a third aspect of the invention, the transmitting apparatus is used as a node.

DETAILED DESCRIPTION OF THE PREFERRED EMBODIMENT

A case where packet transmitting method and apparatus according to the invention are applied to an, ATM switchboard as one of various nodes of an ATM network will be described by way of an embodiment.

The embodiment is characterized in that attention is paid to a point that fields of an ATM cell except for a field for identifying that the cell is an idle cell are meaningless fields for a transmitting apparatus and a vain electric power which is consumed in the transmitting apparatus in order to process the meaningless fields is reduced.

Figure 2:
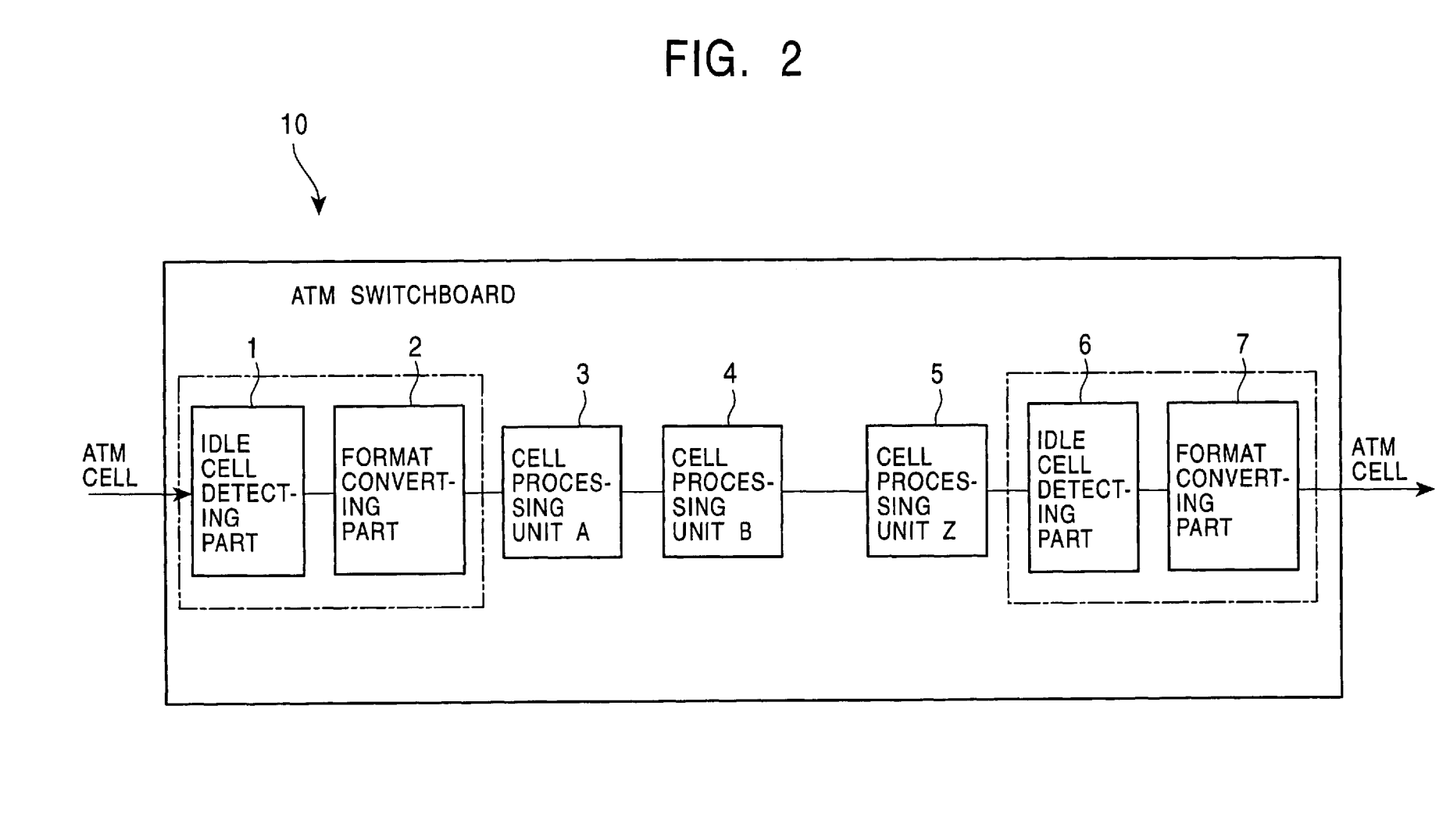
FIG. 2 is a block diagram schematically showing an ATM switchboard as an embodiment of the packet transmitting apparatus according to the invention.

FIG. 2 shows an embodiment of the transmitting apparatus, that is, an ATM switchboard 10.

In FIG. 2, at the left end, an idle cell detecting unit 1 for receiving an ATM cell supplied from another ATM switchboard, terminal, or the like and detecting whether the cell is an idle cell or not is provided.

In order to convert the idle cell detected by the idle cell detecting unit 1 into a predetermined format, which will be described later, a format converting unit 2 is connected to an output terminal of the idle cell detecting unit 1.

Cell processing units A to Z designated by reference numerals 3 to 5 provided at the post stage of the format converting unit 2 are function blocks in the ATM switchboard 10. Specifically, each of them is, for example, a CMOS IC or CMOS LSI of one package mounted on a circuit interface board in the ATM switchboard 10.

One cell processing unit performs all or a part of one function or all or a part of a plurality of functions of the ATM layer such as a header conversion and the like. The details of these functions are not described here.

At the stage next to the last one of the cell processing units, there is provided an idle cell detecting unit 6 for detecting an idle cell among cells which are supplied from the cell processing unit 5. A format converting unit 7 for returning the format of the idle cell to the original state is connected to an output terminal of the idle cell detecting unit 6.

The reason why the format of the idle cell is returned to the original state as mentioned above is because that the format of the idle cell in a transmission path out of the transmitting apparatus such as a switchboard 10 or the like has been determined by the ITU-T I.432 recommendation.

Another ATM switchboard, ATM terminal, or the like can be connected to an output terminal of the format converting unit 7.

Figure 3:
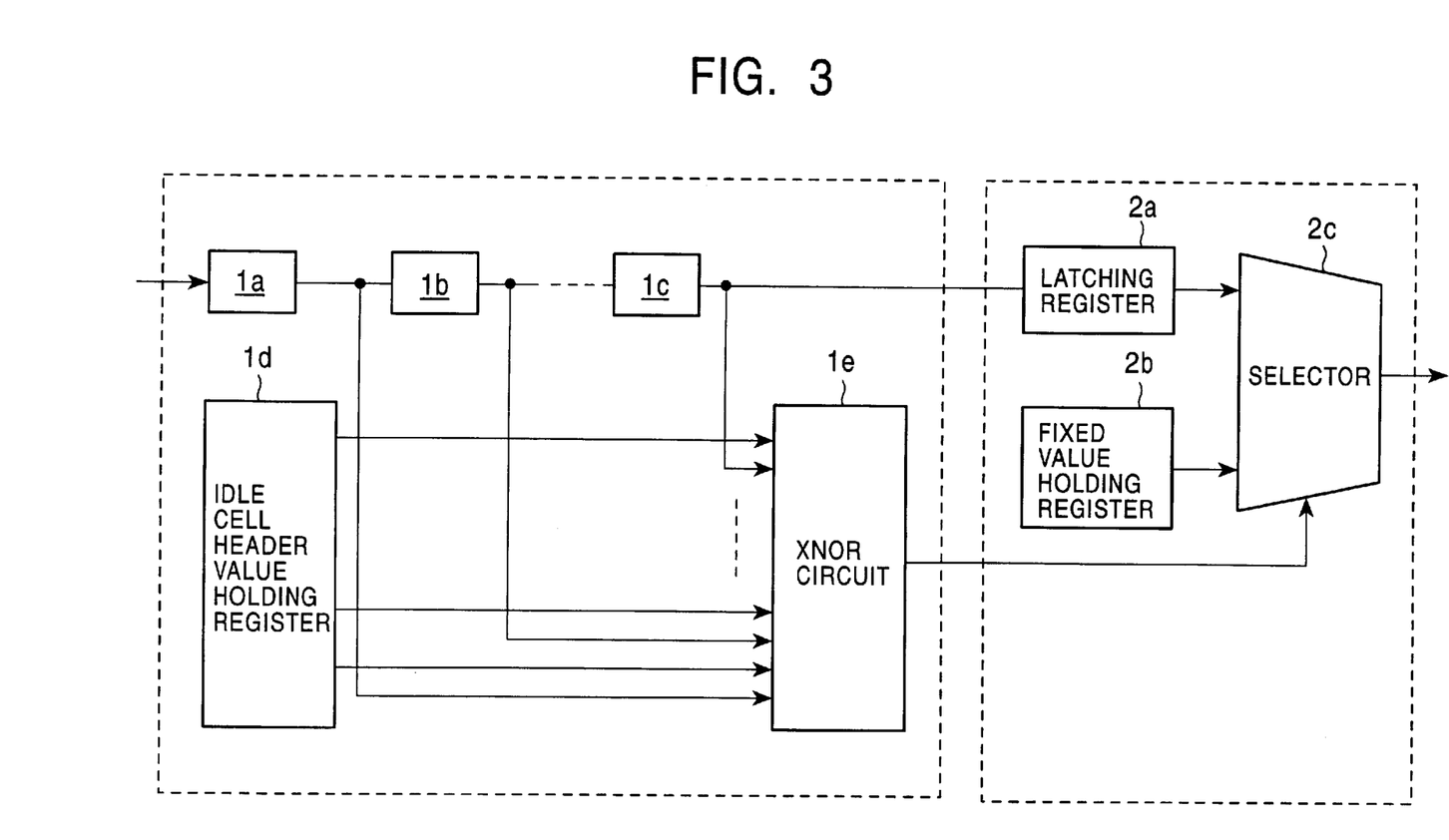
FIG. 3 is a block diagram showing the idle cell detecting part 1 and the format converting part 2 shown in FIG. 2.

FIG. 3 is a block diagram showing an example of the idle cell detecting part 1 and the format converting part 2 shown in FIG. 2.

As shown in FIG. 3, the idle cell detecting part 1 includes a plurality of latching registers 1a, 1b, . . . 1c, connected in series, for latching cell header values, each of which latches one byte data. The idle cell detecting part 1 supplies the incoming ATM cells to the latching registers 1a, 1b, . . . 1c for latching cell header values. From each of the latching registers 1a, 1b, . . . 1c, the latched value is supplied to an XNOR circuit 1e for comparing header values. The idle cell detecting part 1 further include a register 1d for holding idle cell header values, in which predetermined bit patterns of the cell header of idle cells are held. The values held in the register 1d are supplied, in bytes, to the XNOR circuit 1e for comparing header values.

The idle cell detecting part 1 is constituted in the manner as described above, and an idle cell detecting signal is produced at the XNOR circuit 1e for comparing header values, when the latched values latched by the latching registers 1a, 1b, . . . 1c are all coincident with the predetermined bit patters supplied from the register 1d for holding idle cell header values. The produced idle cell detecting signal is supplied to the format converting part 2. The idle cell detecting part 1 also supplies an output data of the last one of the cell header value latching register 1c to the format converting part 2.

In the format converting part 2, the ATM cells supplied from the idle cell detecting part 1 are supplied to an FIFO buffer 2a. The format converting part 2 is provided with a fixed value holding register 2b which holds a plurality of "0"s or "1"s as the fixed value of the idle cell identification field. The format converting part 2 is provided with a selector 2c for selectively supplying the output data from the FIFO buffer 2a or the fixed value from the fixed value holding register 2b. When the idle cell detecting signal is supplied from the idle cell detecting part 1, the selector 2c supplies the fixed value of the idle cell identifying field, and in other case supplies the output data from the FIFO buffer 2a, to the cell processing part 3 shown in FIG. 3.

Figure 4:
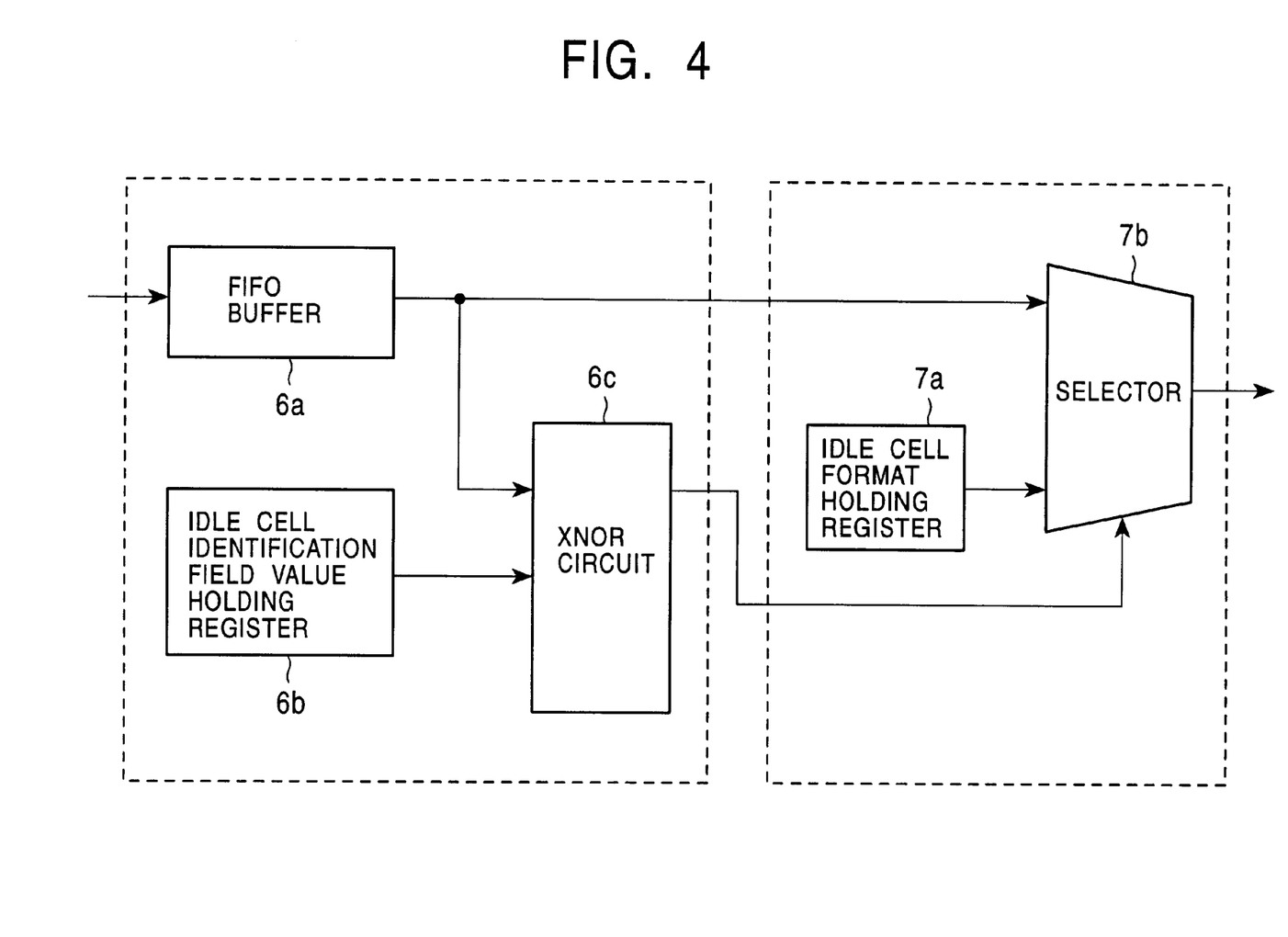
FIG. 4 is a block diagram showing the idle cell detecting part 6 and the format converting part 7 shown in FIG. 2.

FIG. 4 is a block diagram showing an example of the idle cell detecting part 6 and the format converting part 7 shown in FIG. 2.

As shown in FIG. 4, the idle cell detecting part 6 includes an identification field latching register 6a for latching input data. The idle cell detecting part 6 supplies the incoming ATM cells from the cell processing part 5 to the identification field latching register 6a. From the latching register 6a, the latched value is supplied to an XNOR circuit 6c. The idle cell detecting part 6 further include a register 6b for holding an identification field value of the idle cell, in which predetermined bit patterns are held identification field value. The value held in the register 6b is supplied to the XNOR circuit 6c.

The idle cell detecting part 6 is constituted in the manner as described above, and an idle cell detecting signal is produced at the XNOR circuit 6c for comparing identification field values, when the value supplied from the latching register 6a coincides with the predetermined bit patter supplied from the register 6b for holding the identification field value of the idle cell. The produced idle cell detecting signal is supplied to the format converting part 7. The idle cell detecting part 6 also supplies an output data of the last one of the identification fields latching register 6a to the format converting part 7.

In the format converting part 7, the ATM cells supplied from the idle cell detecting part 6 are supplied to an FIFO buffer 2a. The format converting part 2 is provided with an idle cell format holding register 7a which holds a value constituted by a repetition of "01101010". The selector 7b selectively outputs the supplied ATM cells or the value from the idle cell format holding register 7a. When the idle cell detecting signal is supplied from the idle cell detecting part 6, the selector 7b outputs the value from the idle cell format holding register 7a, and in other case outputs the supplied ATM cells.

Figure 5A:
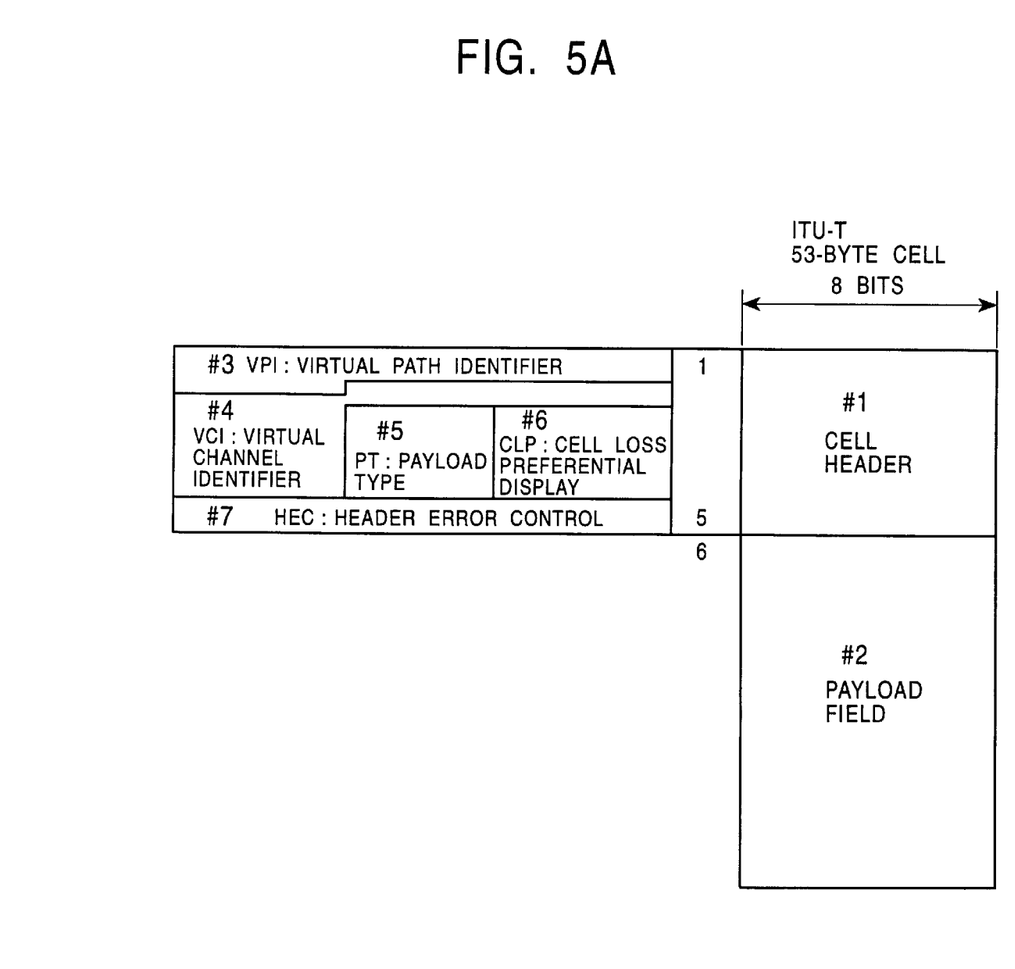
FIGS. 5A and 5B are schematic diagrams showing formats of ATM cells according to the embodiment.

An ATM cell having valid user information conforming to the ITU-T recommendation has a cell structure as shown in FIG. 5A.

In FIG. 5A, in a cell header #1 of five bytes, fields of a VPI (virtual path identifier) #3, a VCI (virtual channel identifier) #4, a PT (payload type) #5, a CLP (cell loss preferential display) #6, and an HEC (header error control) #7 are provided.

A bit pattern of the five bytes of the cell header of the idle cell is also determined. It is sequentially shown one by one from the upper byte in FIG. 5A as "00000000 00000000 00000000 00000001 01010010". "1" of the least significant bit of the second last one byte corresponds to one bit of the CLP #6 and "01010010" of the last one byte corresponds to the HEC #7.

In the payload field of the idle cell has 48 bytes in which one byte having the bit pattern of 6AH, that is, "01101010" is repeated.

The number of alternating times between "1" and "0" in the last two bytes "00000001 01010010" of the cell header is equal to eight. Since "01101010" in which the number of alternating times per byte is equal to six exists in the payload field by an amount corresponding to 48 bytes, the number of alternating times for all of the bits of one cell, that is, an alternation ratio is as follows.

$$(8+6\times 48)/(8\times 53)=69.8\%$$

The operation of the embodiment having the structure as mentioned above will now be described hereinbelow.

An ATM cell transmitted to the ATM switchboard 10 is first sent to the idle cell detecting unit 1.

Since all of the bits of the VPI #3, VCI #4, and PT #5 are equal to "0" and the CLP #6 is equal to "1" in the header of the relevant ATM cell, the idle cell detecting unit 1 detects that the relevant cell is the idle cell.

Although the ATM cell which is not detected as an idle cell by the idle cell detecting unit 1 is transmitted to the cell processing unit 3 without being processed by the format converting unit 2 at the next stage, a format of the ATM cell detected as an idle cell is converted.

In this format conversion, all bits of the payload field #2 are converted into "0".

By converting all of the bits of the 48 bytes to "0", the number of alternating times is equal to only eight times of the cell header, so that an alternation ratio per cell is as follows.

$$8/(8\times53)=1.9\%$$

All of the bits can be also converted to "1" instead of converting all of the bits of the payload field #2 to "0".

The cell processing unit 3 which receives the supply of the idle cell which was format converted as mentioned above executes a process similar to the ATM cell having another valid payload for the relevant cell without particularly recognizing that the relevant cell is the idle cell.

There is generally a tendency such that an electric power consumption of a CMOS increases as the number of repetition times of the on/off operations increases due to what is called a through current or the like which flows like a spike at a moment when two transistors constructing the CMOS are simultaneously ON. When seeing the relation with the cell, the on/off operations are caused in correspondence to a principle such that the bits of the cell which is read by the CMOS circuit are alternating between "0" and "1". When the cell in which all bits were converted to "0" by the format converting unit 2 is processed, an electric power consumption of the cell processing unit 3 is small.

Even when the cell supplied from the cell processing unit 3 is processed by the cell processing unit 4, . . . , and the cell processing unit 5, since the above point shall also similarly apply, the electric power consumption in each cell processing unit decreases.

The cell supplied from the cell processing unit 5 as a last cell processing unit is transferred to the idle cell detecting unit 6 on the output side.

In the idle cell detecting unit 6, in a manner similar to the idle cell detecting unit 1, all of the bits of the VPI #3, VCI #4, and PT #5 are equal to "0" in the header of the relevant cell and the CLP #6 is equal to "1", so that it is detected that the relevant cell is the idle cell.

The cell detected as being the idle cell is sent to the format converting unit 7 at the next stage, by which the payload field is returned to the format constructed by the repetition of original "01101010" and, after that, the cell is transmitted to an external transmission path of the switchboard 10.

The cell which is not detected as an idle cell by the idle cell detecting unit 6 is transmitted as it is to the transmission path without being processed by the format converting unit 7.

According to the embodiment described above, when the ATM cell is serially read by using the CMOS circuit, the electric power consumption of each circuit in the ATM switchboard is small. This effect is particularly remarkable in the case where the using ratio of the transmission path is small, namely, the number of idle cells is large.

Figure 5B:
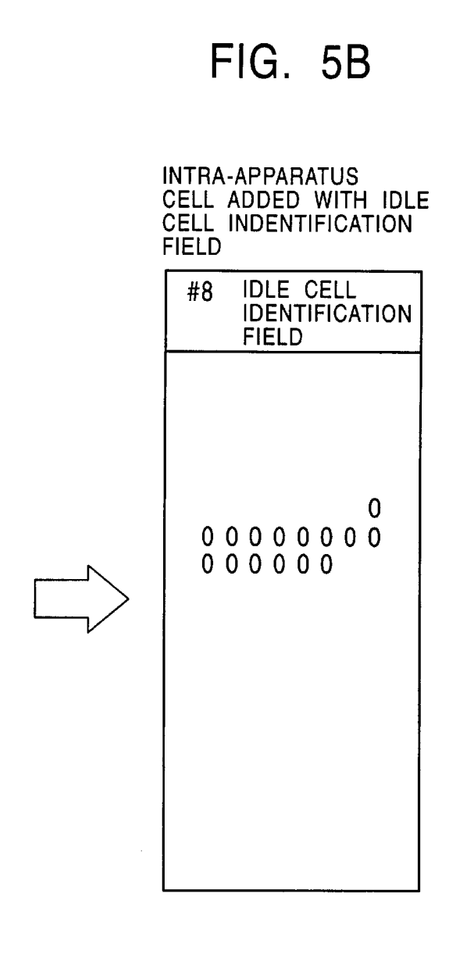

In the above explanation, although only the payload field of the ATM cell detected as an idle cell has been format converted, as shown in FIG. 5B, the format can be also changed by converting all of the bits of the ATM cell of 53 bytes to "0" (or all bits are converted to "1") and adding an idle cell identification field #8. The idle cell identification field #8 is added to notify the idle cell detecting unit 6 on the output side of a fact that the relevant cell is the idle cell. Although the size is set to the field of one byte here, it can be also set to the field larger or smaller than one byte as necessary.

The reason why the idle cell identification field #8 is added to 53 bytes is because the change of the hardware of the cell processing units 3 to 5 for processing the ATM cell inherently constructed by 53 bytes is made unnecessary, or even if it is changed, a degree of change is reduced as much as possible. So long as the idle cell detecting unit 6 on the output side can recognize, the idle cell identification field can be also provided in the cell header or payload field as necessary.

In the case that the non-preferential cell is preferentially discarded in the switchboard 10, if all of the bits of the ATM cell are converted to "0" and the bits up to the CLP are also converted to "0", it will result that the idle cell is treated as a preferential cell. Therefore, a countermeasure may be taken such that all of the bits of the ATM cell are simply format converted to "1" by the format conversion process, or only the CLP is converted to "1", or the like.

As mentioned above, since the payload field is constructed by the repetition of "01101010" in the case of the idle cell, the idle cell detecting unit 1 can also detect the idle cell based on it. In this case or a case of adding the idle cell identification field #8 or the like, the idle cell detecting method of the idle cell detecting unit 1 on the input side and the idle cell detecting method of the idle cell detecting unit 6 on the output side are not necessarily identical.

Although the explanation has been made so far with respect to the ATM switchboard 10, further, the present invention is not limited to the ATM switchboard but can be also applied to another ATM transmitting apparatus such as a multiplexing apparatus or the like and a network including the transmitting apparatus.

Figure 6:
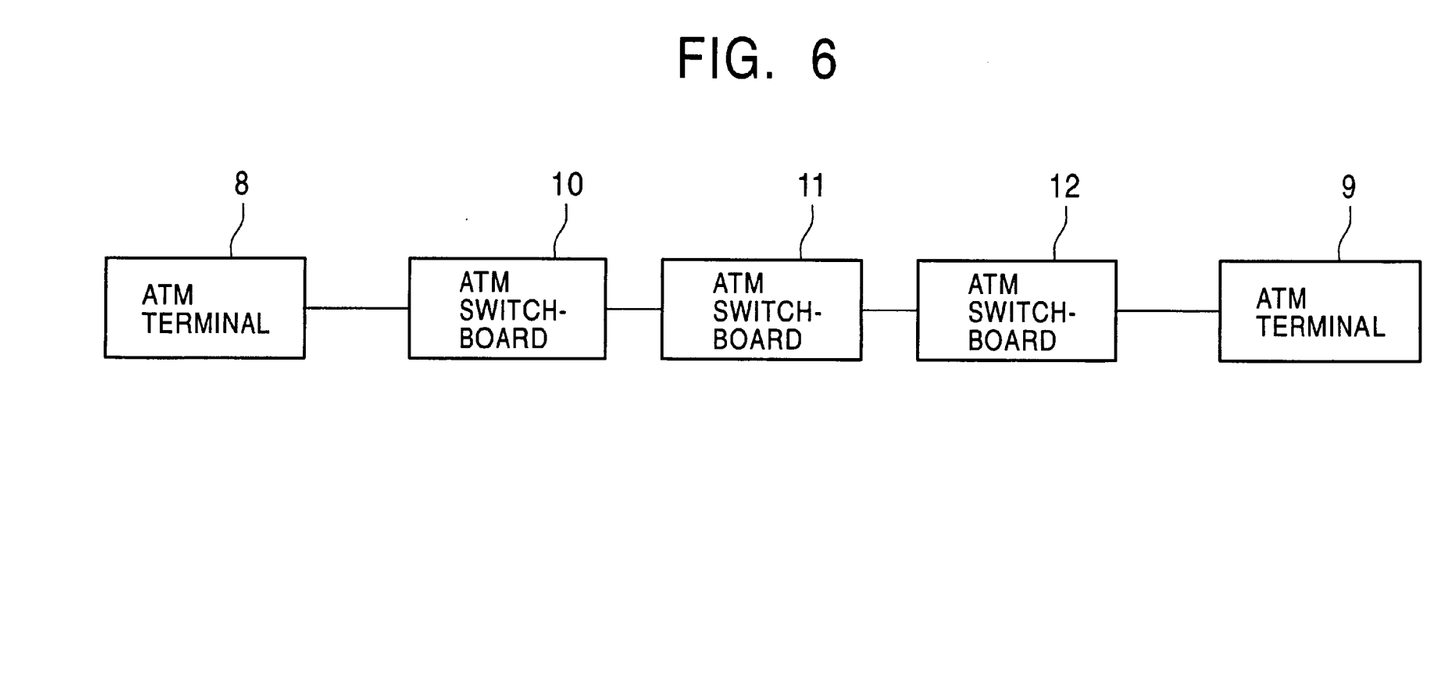
FIG. 6 is a block diagram showing an example of the network according to the present invention.

FIG. 6 shows an example of the network according to the present invention.

As shown in the figure, three ATM switchboards are connected, as switching nodes, between a pair of ATM terminals 8, and 9. Each of the ATM switchboard has a structure as shown in FIG. 2, as the packet transmitting apparatus according to the present invention.

The invention is not limited to the ATM transmission but can be also applied to a packet transmission in which the user information area can be handled as "don't care" in the transmitting apparatus.

That is, the invention can be widely applied to a case where after a packet having the control information area and the user information area was processed by a functional block in the node, the packet is transmitted from the relevant node.

According to the packet transmitting method and apparatus of the invention as mentioned above, a vain electric power which is consumed to read, transmit, and process the packet which does not have the valid user information in the user information area in the node can be reduced.

Further, in the network of the invention, by applying the packet transmitting apparatus as mentioned above to each node, the electric power consumption can be also reduced as a whole network.

What is claimed is:

1. A packet transmitting method of processing a packet having a control information area and a user information area by a functional block in a node and, thereafter, transmitting the packet from said node, comprising the steps of:

discriminating whether information of said user information area of said packet is useless user information or not on the basis of the information of said control information area or said user information area;

converting said packet determined to include useless user information in said discriminating step into a predetermined format in which the number of alternating times of a bit pattern has been reduced and allowing said packet to pass through said functional block; and returning the bit pattern of said packet to a state before said conversion at least before said packet is transmitted from said node.

2. A method according to claim 1, wherein said packet is an ATM cell, and said predetermined format is a format in which at least all bits of a payload portion of said ATM cell are integrated to either one of "0" and "1".

3. A packet transmitting apparatus for processing a packet having a control information area and a user information area by a functional block in a node and, thereafter, transmitting the packet from said node, comprising:

discriminating means for discriminating whether information of said user information area of said packet is useless user information or not on the basis of information of said control information area or said user information area;

first format converting means for converting said packet determined to include useless user information into a predetermined format in which the number of alternating times of a bit pattern has been reduced and allowing said packet to pass through said functional block; and second format converting means for returning the bit pattern of said packet to a state before said conversion at least before said packet is transmitted from said node.

4. An apparatus according to claim 3, wherein said packet is an ATM cell, and said predetermined format is a format in which at least all bits of a payload field of said ATM cell are integrated to either one of "0" and "1".

5. A network using a packet transmitting apparatus, as a node, for processing a packet having a control information area and a user information area by a functional block in the node and, thereafter, transmitting the packet from said node, said packet transmitting apparatus comprising:

discriminating means for discriminating whether information of said user information area of said packet is useless user information or not on the basis of information of said control information area or said user information area;

first format converting means for converting said packet determined to include useless user information into a predetermined format in which the number of alternating times of a bit pattern has been reduced and allowing said packet to pass through said functional block; and second format converting means for returning the bit pattern of said packet to a state before said conversion at least before said packet is transmitted from said node.

6. A network according to claim 5, wherein said packet is an ATM cell, and said predetermined format is a formation which at least all bits of a payload field of said ATM cell are integrated to either one of "0" and "1".

* * * * *